United States Patent
Seo et al.

(10) Patent No.: US 9,972,965 B1
(45) Date of Patent: May 15, 2018

(54) APPARATUS AND METHOD FOR STABILIZING A LIGHT

(71) Applicant: Myongji University Industry and Academia Cooperation Foundation, Yongin, Gyeonggi-do (KR)

(72) Inventors: Dong Sun Seo, Gyeonggi-do (KR); Yong Yuk Won, Gyeonggi-do (KR)

(73) Assignee: Myongji University Industry and Academia Cooperation Foundation, Yongin, Gyeonggi-do (KR)

( * ) Notice: Subject to any disclaimer, the term of this patent is extended or adjusted under 35 U.S.C. 154(b) by 0 days. days.

(21) Appl. No.: 15/431,084

(22) Filed: Feb. 13, 2017

(30) Foreign Application Priority Data

Nov. 16, 2016 (KR) .......................... 10-2016-0152448

(51) Int. Cl.
*H01S 3/067* (2006.01)
*H01S 3/16* (2006.01)
*H01S 3/13* (2006.01)

(52) U.S. Cl.
CPC ............ *H01S 3/1305* (2013.01); *H01S 3/067* (2013.01); *H01S 3/1608* (2013.01)

(58) Field of Classification Search
CPC .. H01S 3/1608; H01S 3/06754; H01S 3/1305; H01S 3/067541
See application file for complete search history.

(56) References Cited

U.S. PATENT DOCUMENTS

| 6,122,299 A * | 9/2000 | DeMars | G02B 6/122 372/103 |
| 6,205,165 B1 * | 3/2001 | Yamamoto | B82Y 20/00 372/101 |
| 2003/0152125 A1 * | 8/2003 | Kinoshita | H01S 5/187 372/96 |
| 2005/0111848 A1 * | 5/2005 | Grubb | G02B 6/12007 398/147 |

FOREIGN PATENT DOCUMENTS

KR  10-2003-0072002 B  9/2003

* cited by examiner

*Primary Examiner* — Eric L Bolda
(74) *Attorney, Agent, or Firm* — Mintz Levin Cohn Ferris Glovsky and Popeo, P.C.; Kongsik Kim; Colleen H. Witherell

(57) ABSTRACT

An apparatus and a method for stabilizing output of a light source are disclosed. The stabilization device located outside of a light source comprises a stabilization element, and a stabilization controller configured to control a light output from the light source so that a part of the light output and other part of the light cross propagate in the stabilization element.

12 Claims, 4 Drawing Sheets

APPARATUS AND METHOD FOR STABILIZING A LIGHT

CROSS-REFERENCE TO RELATED APPLICATION

This application claims priority under 35 U.S.C. § 119(a) to Korean Application No. 10-2016-0152448 filed on Nov. 16, 2016, the entire disclosure of which is incorporated herein by reference.

TECHNICAL FIELD

The present disclosure relates to an apparatus and method for stabilizing the output of a pulsed or CW (continuous wave) light source.

RELATED ART

To apply a light source to various fields, it is necessary to enhance the performance (stability) of the light source.

A conventional technique inserts specific components inside a light source (such as a laser resonator) or injects externally a stabilized light into the light source, so as to enhance the stability of the light source which operates in pulsed (mode-locked laser, gain switching laser, etc.) or continuous wave (CW).

However, the inserted device(s) and/or externally injected light in conventional techniques change the characteristics of the laser output. For example, in a pulsed laser, its characteristics such as pulse period, width, spectrum, and so on, may be changed. In a CW laser, the characteristics such as oscillation frequency, etc. may be altered.

SUMMARY

The invention has been made to address at least the disadvantages and problems described above, and to provide at least the advantages described below. An aspect of the invention provides an apparatus and method for enhancing stability of a light source by passing simply the light output through a stabilization device (such as a periodic loss/gain device) without changing the characteristics of a light source.

According to one embodiment of the invention, a stabilization device located outside a light source comprising: a stabilization element; and a stabilization controller configured to control the light output so that a part of the light and the other part of the light cross propagate in the stabilization element.

According to one embodiment of the invention, a light generator comprising: a light source configured to output a light; and a stabilization device configured to perform stabilization operation for both parts of the cross propagating light.

According to one embodiment of the invention, a method of stabilizing output of a light comprising: stabilizing a part of output of a light source; stabilizing other part of the output; and producing the stabilized light. Here, the part of the light and the other part of the light cross propagate in a stabilization element.

According to another embodiment of the invention, a stabilization device located outside a light source comprising: a stabilization element to which the output of a light source is injected; and an optical reflector configured to reflect the injected light and to re-inject the reflected light into the stabilization element. Here, the direct light output and the reflected light by the optical reflector cross propagate through the stabilization element.

According to another embodiment of the invention, a method of stabilizing output of a light comprising: stabilizing the output of a light source by (single) passing the light through a stabilization element; maximizing the stabilization performance by reflecting and cross propagating the stabilized light through the stabilization element; and producing the re-stabilized light.

An apparatus and method for stabilizing a light according to the invention make a part of the output of a light source and the other part of the light cross propagate in a stabilization element, and thus stability of output of the light may be enhanced.

BRIEF DESCRIPTION OF DRAWINGS

The aspects, features, advantages and embodiments of the invention will be more apparent from the following detailed description taken in conjunction with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

The invention relates to an apparatus for stabilizing output of a light source (such as, laser), and enhances the stability of the light by using a simple method of passing the light output from a light source through an external stabilization element. Specially, the invention provides a technique for enhancing stability of output of the light, without changing the original output characteristics of the light. The timing jitter and phase noise of the pulsed light source are reduced or the phase noise of a CW light source is decreased according to the enhancement of their stability.

In one embodiment, the invention increases a spatial hole burning effect by cross propagating a part of the light and the other part of the light in the stabilization element. As a result, the phase noise (or timing jitter) of a CW light (or pulsed light) is considerably reduced, thereby enhancing the stability of the CW light (or pulsed light).

Hereinafter, embodiments of the invention will be described in detail with reference to accompanying drawings.

Figure 1:
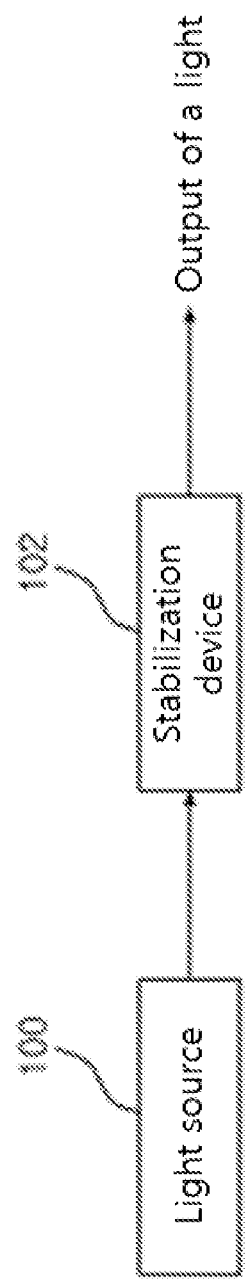
FIG. 1 is a block diagram illustrating a light generator according to one embodiment of the invention.
Figure 2:
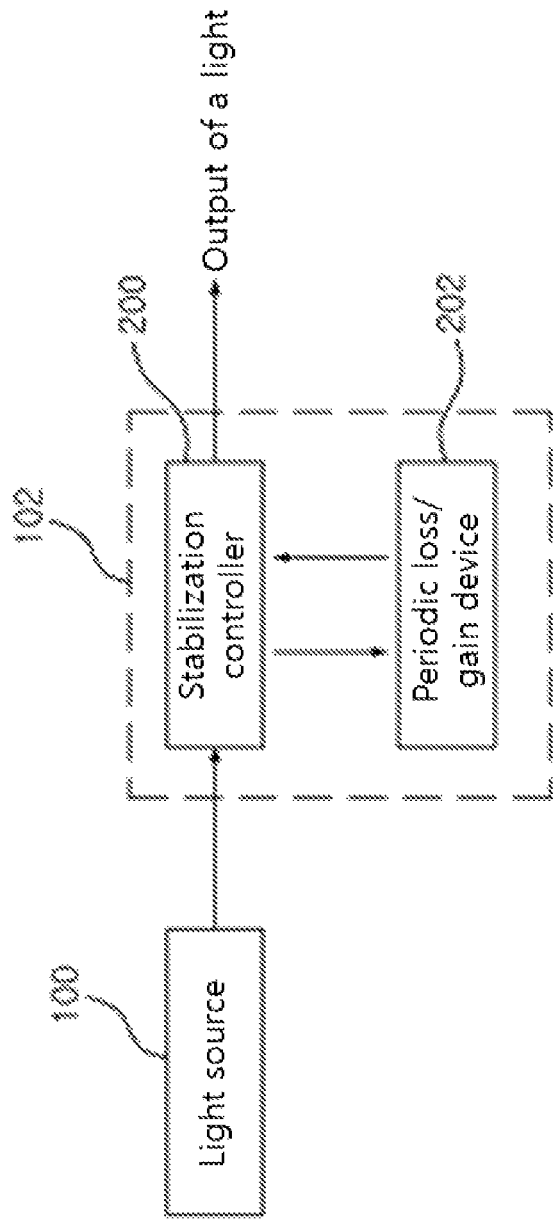
FIG. 2 is a block diagram illustrating a stabilization device according to one embodiment of the invention.

FIG. 1 is a block diagram illustrating a light generator according to one embodiment of the invention, and FIG. 2 is a block diagram illustrating a stabilization device according to one embodiment of the invention.

In FIG. 1, the light generator of the present embodiment includes a light source 100 in continuous or pulsed wave and a stabilization device 102.

The stabilization device 102 stabilizes a light output from the light source 100 and produces the stabilized light.

In one embodiment, a part of the light output from the light source 100 and the other part of the light cross propagate in the stabilization element of the stabilization device 102, thereby enhancing stability of the light output.

Particularly, the stabilization device 102 may include a stabilization controller 200 and a periodic loss/gain device 202 as the stabilization element as shown in FIG. 2, so as to enhance the stabilization of the light.

The periodic loss/gain device 202 performs an operation of stabilizing the light, and may use for example an erbium doped fiber (EDF).

The EDF performs an active operation of amplifying (or attenuating) an injected light unlike the conventional optical fiber for performing only passive operation of propagating a light. As a result, the propagation loss of the optical fiber may be minimized or the propagation gain may occur in only a specific condition.

The stabilization controller 200 passes the output of the light source 100 through the periodic loss/gain device 202, thereby enhancing the stability of the light.

Particularly, the stabilization controller 200 controls propagation of the light so that the light can pass through the periodic loss/gain device 202.

On the other hand, a technique that a periodic loss/gain device is installed inside a light source may be considered. However, it results in characteristic change of output of the light.

Whereas, if the periodic loss/gain device 202 is established outside of the light source 100, it may enhance stability of the output of the light source without changing the output characteristics of the light source.

Specially, the light propagates through the periodic loss/gain device 202 under the condition that the periodic loss/gain device 202 is established outside of the light source 100. As a result, the stability of the output of the light source is enhanced by passing simply through the periodic loss/gain device 202 which is established outside of the light source 100.

Figure 3:
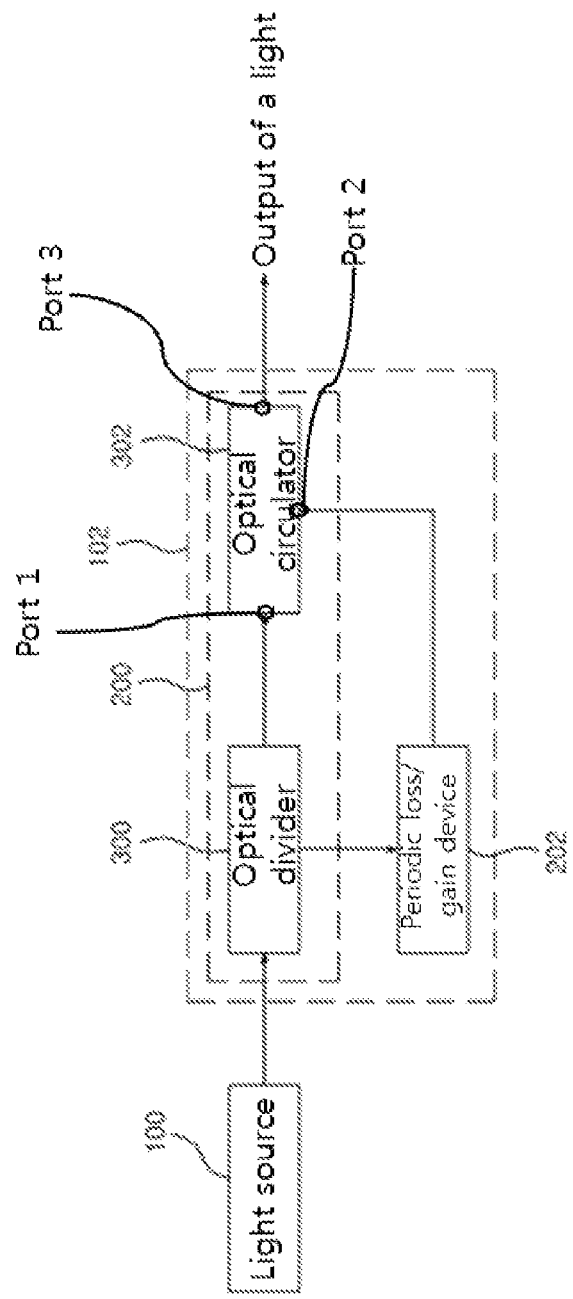
FIG. 3 is a block diagram illustrating a stabilization device including a stabilization controller according to one embodiment of the invention.

It enhances even further the stability if a part of the light from the light source 100 and the other part of the light cross propagates in the periodic loss/gain device 202 as shown in FIG. 3. Of course, it is possible to enhance the stability of the light from the light source 100 by simply propagating through the periodic loss/gain device 202 in case that the cross propagation of the light through the periodic loss/gain device 202 is impractical.

FIG. 3 is a block diagram illustrating a stabilization device including a stabilization controller according to one embodiment of the invention.

In FIG. 3, the stabilization device 200 of the present embodiment may include an optical divider 300 and an optical circulator 302.

The optical divider 300 divides the output of the light source 100. Particularly, the optical divider 300 may propagate a part of the output to the optical circulator 302 and transmit the other part of the output to the periodic loss/gain device 202.

The optical circulator 302 delivers the part of the light from the optical divider 300 (port 1) to the periodic loss/gain device 202 (port 2), and transfers the other part of the light passing through the periodic loss/gain device 202 (port 2) to the output of the light (port 3).

In view of the periodic loss/gain device 202, a part of the light divided by the optical divider 300 and the other part of the light from the optical circulator 302 cross propagate through the periodic loss/gain device 202, and the part of the light is outputted through the port 3 of the optical circulator 302.

Briefly, the stabilization device of the present embodiment makes the part of the light (CW or pulsed) and the other part of the light cross propagate in the periodic loss/gain device 202, thereby enhancing the stability of the output of the light source 100.

In another view, the stabilization device of the invention may divide the light output from the light source 100 into the part of the light and the other part of the light, and then perform a stabilization operation about the part of the light and the other part of the light, respectively.

In view of a method, an operation of stabilizing the light of the invention may include a step of dividing the light output from the light source 100 into the part of the light and the other part of the light, a step of stabilizing the part of the light by passing the part of the light through the periodic loss/gain device 202, a step of stabilizing the other part of the light by passing the other part of the light through the periodic loss/gain device 202, and a step of producing the stabilization light. Here, the part of the light and the other part of the light may cross propagate in the periodic loss/gain device 202.

Figure 4:
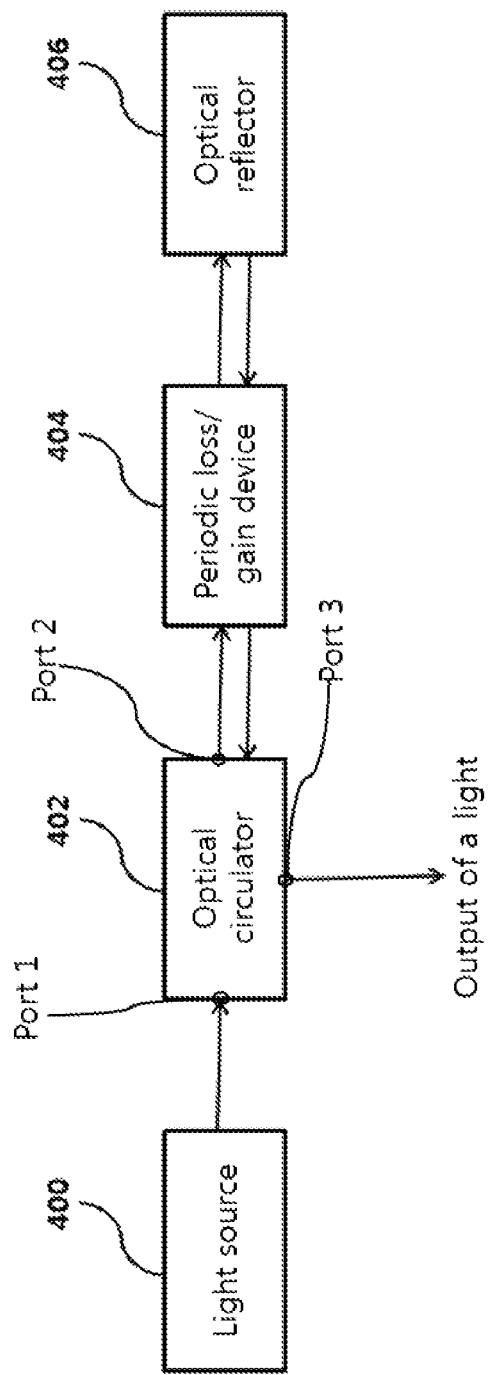
FIG. 4 is a block diagram illustrating a light generator according to another embodiment of the invention.

FIG. 4 is a block diagram illustrating a light generator according to another embodiment of the invention.

In FIG. 4, the light generator of the present embodiment may include a light source 400, an optical circulator 402, a stabilization element (such as a periodic loss/gain device) 404 and an optical reflector 406.

The light source 400 outputs a light, for example may be a CW or pulsed laser.

The optical circulator 402 located outside the light source 400, delivers the light output (port 1) from the light source 400 to the periodic loss/gain device 404 (port 2), and transfers the reflected light (port 2) by the optical reflector 406 after passing through the periodic loss/gain device 404, to the output (port 3) of a (stabilized) light.

The periodic loss/gain device 404 performs an operation of stabilizing the light, and may use for example an EDF.

The optical reflector 406 may reflect the light transmitted from the periodic loss/gain device 404 to re-inject the reflected light to the periodic loss/gain device 404.

In one embodiment, the optical reflector 406 may perform a function of amplifying the light as well as a function of reflecting the light. In this case, the optical reflector 406 may compensate any loss of the periodic loss/gain device 404.

The light reflected by the optical reflector 406 is transmitted to the optical circulator 402 through the periodic loss/gain device 404, and then is outputted outside.

As a result, the output of the light source 400 and the light reflected by the optical reflector 406 cross propagate in the periodic loss/gain device 404. That is, the output of the light source will be further stabilized by a hole burning effect due to the cross propagation of the light.

In view of the periodic loss/gain device 404, the light transmitted from the optical circulator 402 and the light reflected by the optical reflector 406 cross propagate in the periodic loss/gain device 404. That is, the light generator of the invention enhances the stability of the light by using a way of cross propagating the light in the periodic loss/gain device 404.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

What is claimed is:

1. A stabilization device located outside a light source comprising:
    a stabilization element configured to stabilize a spectrum of a light outputted from a light source by reducing phase noise of the light; and
    a stabilization controller configured to control the light that a part of the output of the light source and the other part of the light cross propagate in the stabilization element,
    wherein the stabilization device is a periodic loss/gain device and uses an erbium doped fiber (EDF.

2. The stabilization device of claim 1, wherein the stabilization controller includes:
    an optical divider configured to divide the output of a light source; and
    an optical circulator configured to output a light passing through the stabilization element,
    and wherein the optical circulator propagates some of a light not passing through the stabilization element to the stabilization element.

3. A light generator comprising:
    a light source configured to output a light; and
    a stabilization device configured to perform a stabilization operation of a spectrum of a part of the light output from a light source and the other part of the light, respectively,
    wherein the stabilization device is a periodic loss/gain device and uses an erbium doped fiber (EDF).

4. The light generator of claim 3, wherein the stabilization device includes:
    a stabilization element; and
    a stabilization controller configured to control the light output from the light source so that the part of the light output and the other part cross propagate in the stabilization element.

5. The light generator of claim 4, wherein the stabilization controller includes:
    an optical divider configured to divide a light output from a light source; and
    an optical circulator configured to output a light passing through the stabilization element,
    and wherein the optical circulator propagates some of a light not passing through the stabilization element to the stabilization element.

6. A method of stabilizing output of a light, the method comprising:
    stabilizing a spectrum of a part of a light output from a light source by reducing phase noise of the part of the light;
    stabilizing a spectrum of the other part of the light output from the light source; and
    producing further stabilized light,
    wherein the part of the light and the other part of the light cross propagate in a stabilization element, and a stabilization device for the stabilizing is a periodic loss/gain device and uses an erbium doped fiber (EDF).

7. A stabilization device located outside a light source comprising:
    a stabilization element to divide the output of a light source and single pass and/or cross propagate in the stabilization element for stabilizing a spectrum of the light; and
    an optical reflector configured to reflect a light to single pass and/or cross propagate through the stabilization element and the stabilization element is a periodic loss/gain device and uses an erbium doped fiber (EDF).

8. The stabilization device of claim 7, further comprising:
    an optical circulator configured to deliver the light output from the light source to the stabilization element,
    wherein the optical circulator outputs a light transmitted through the stabilization element.

9. The stabilization device of claim 8, wherein the light injects from the optical circulator to the periodic loss/gain device and the light delivers to the periodic loss/gain device after reflected by the optical reflector to cross propagate in the periodic loss/gain device.

10. The stabilization device of claim 8, wherein the optical reflector performs a function of amplifying the light transmitted from the stabilization element as well as a function of reflecting the light.

11. A method of stabilizing output of a light, the method comprising:
    stabilizing a spectrum of a light output from a light source by passing the light through a stabilization element;
    re-stabilizing the stabilized light by reflecting the stabilized light to counter propagate through the stabilization element; and producing the re-stabilized light,
    wherein a stabilization device for the stabilizing is a periodic loss/gain device and uses an erbium doped fiber (EDF).

12. The method of claim 11, wherein the stabilized light is amplified and the amplified stabilized light is reflected to counter propagate through the stabilization element.

* * * * *